United States Patent [19]

Davis

[11] Patent Number: 4,502,374

[45] Date of Patent: Mar. 5, 1985

[54] CLAMSHELL BASKET

[75] Inventor: Jack L. Davis, Louisville, Ky.

[73] Assignee: Winston Products Co., Louisville, Ky.

[21] Appl. No.: 487,183

[22] Filed: Apr. 21, 1983

Related U.S. Application Data

[63] Continuation-in-part of Ser. No. 271,635, Jun. 8, 1981, abandoned.

[51] Int. Cl.³ .............................................. A47J 37/12
[52] U.S. Cl. ........................................ 99/349; 99/418; 99/426; 99/448; 99/449; 99/450; 99/416; 426/509
[58] Field of Search ................ 99/349, 450, 415, 416, 99/417, 418, 448, 449, 426, 403; 426/438, 509, 510, 523; 211/181

[56] References Cited

U.S. PATENT DOCUMENTS

| | | | |
|---|---|---|---|
| 2,191,275 | 2/1940 | Fink | 99/349 X |
| 2,570,374 | 10/1951 | Pompa | 99/416 |
| 2,652,768 | 9/1953 | Moreno | 99/417 |
| 3,484,252 | 12/1969 | Popeil | 426/438 |
| 3,649,290 | 3/1972 | Angold | 426/438 X |
| 3,734,744 | 5/1973 | Albright | 426/438 X |
| 3,985,071 | 10/1976 | Pottinger | 99/449 X |
| 4,123,560 | 10/1978 | Hice | 426/438 X |
| 4,134,998 | 1/1979 | Liebermann | 426/438 |

FOREIGN PATENT DOCUMENTS

| | | | |
|---|---|---|---|
| 1559795 | 2/1969 | France | 99/417 |
| 2051550 | 1/1981 | United Kingdom | 426/438 |

Primary Examiner—Billy J. Wilhite
Attorney, Agent, or Firm—Edward M. Steutermann

[57] ABSTRACT

A cooking basket for use in upwardly open cooking chamber adapted to receive a heat transfer fluid with heater means to selectively heat the heat transfer fluid where the basket is generally cylindrical in shape and adapted to be selectively disposed within the chamber with its longitudinal axis generally parallel to the longitudinal axis of the chamber where the basket is defined by first and second generally porous sidewalls with a mean diameter less than the mean diameter of the chamber, hinge means joining one edge of each of the first and second side wall means so the free ends of the first and second sidewalls can be closed to form the basket and opened about the hinge means to provide access to the chamber defined by the first and second sidewalls and wherein each wall section includes shelf means disposed therein extending transversely from the respective sidewall means so that when the sidewall means are closed the shelf means of the first and second sidewall means are mutually disposed in interleaving fashion and where the hinge means are adapted to permit relative longitudinal movement between the first and second sidewall means so that when the basket is closed the spacing between the shelf means of the first and second sidewall means can be selected to limit expansion of food to be cooked between the shelf means of the first and second sidewall means. Also disclosed is a method of cooking filled pastry devices comprising a pastry shell enclosing selected fillings where a portion of the shell is maintained in contact with the filling during cooking.

6 Claims, 10 Drawing Figures

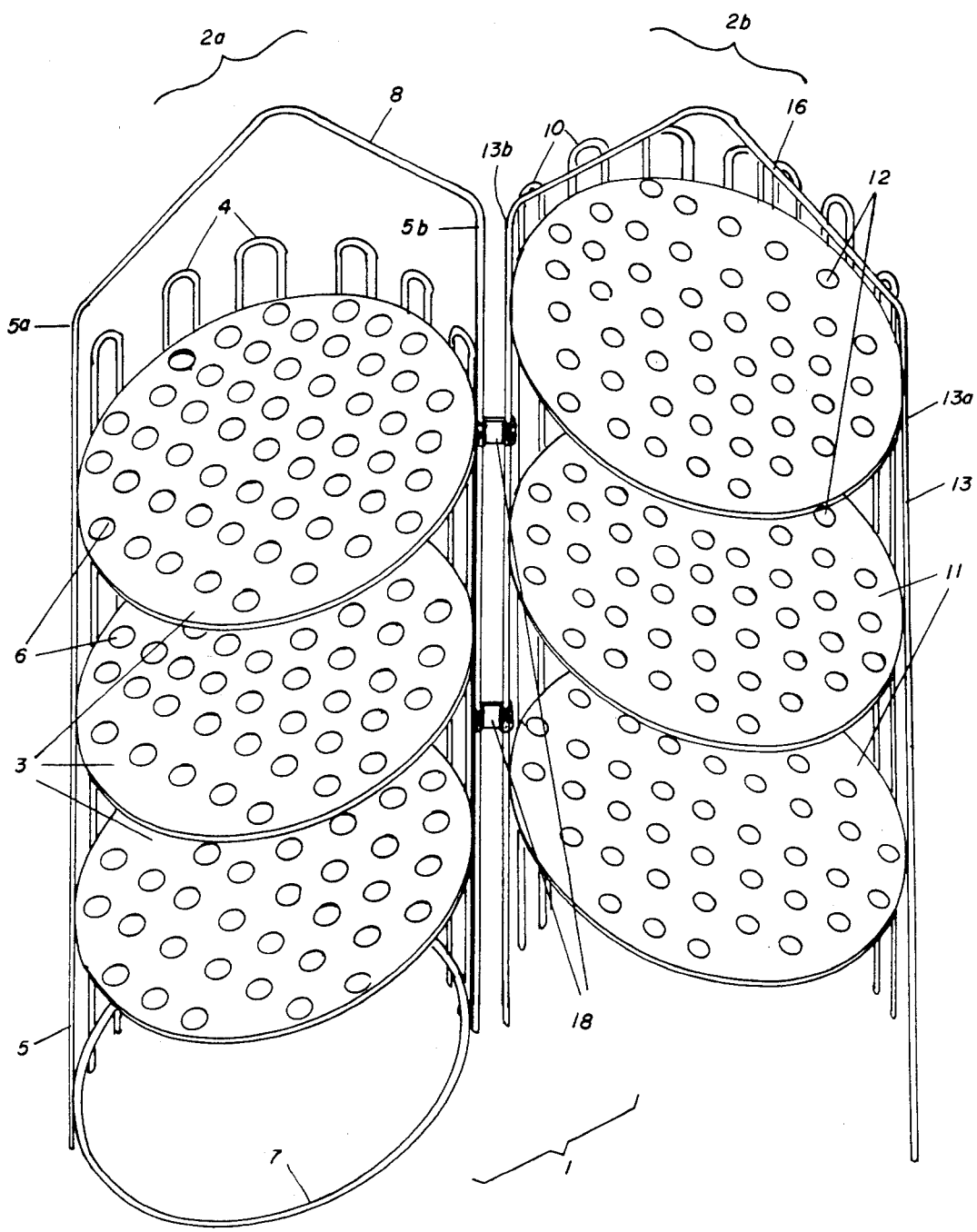
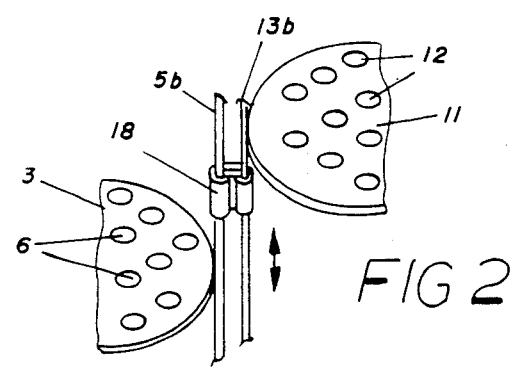
FIG 1
FIG 2

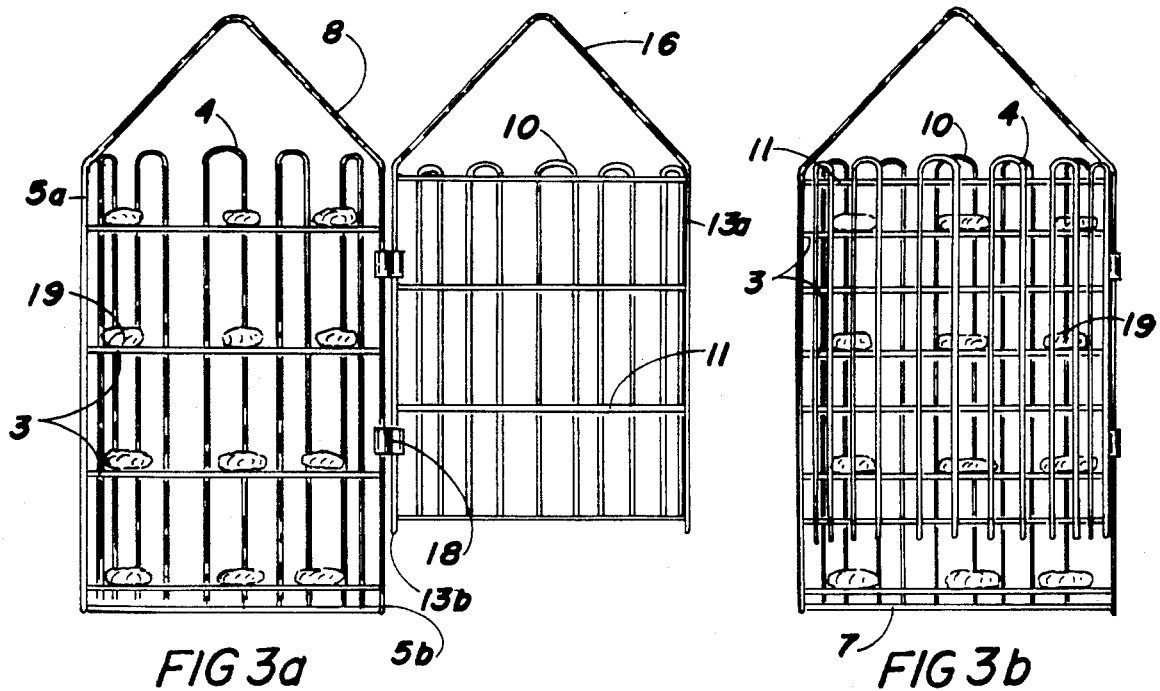
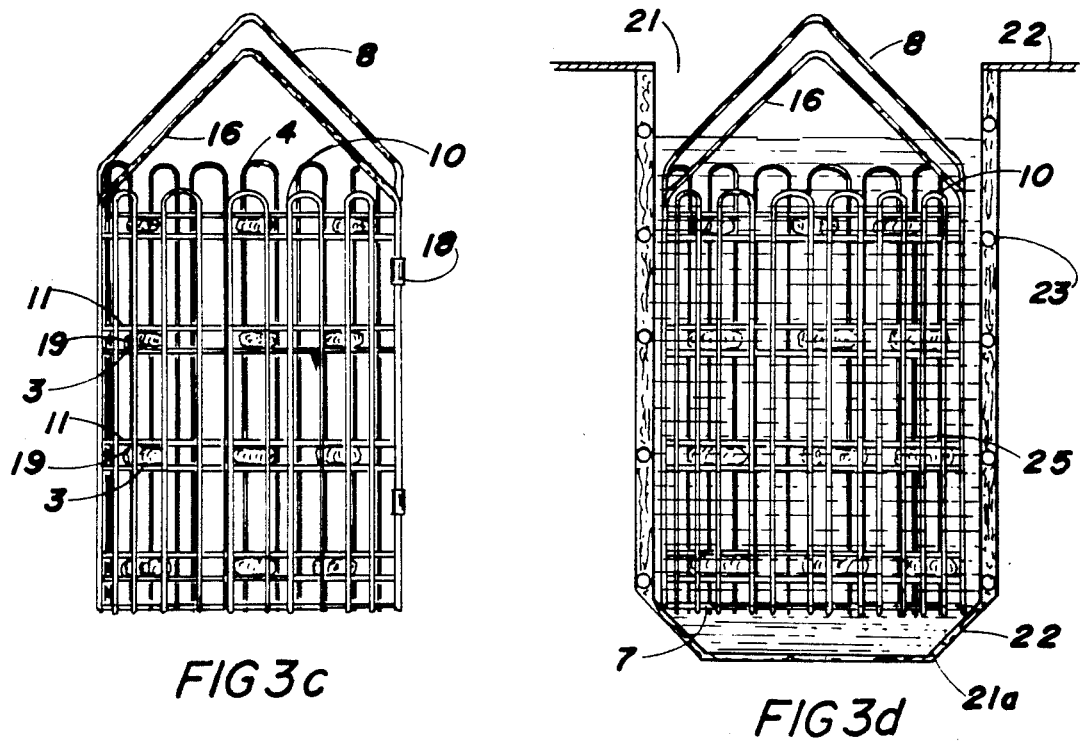

CLAMSHELL BASKET

This is a continuation-in-part of my co-pending application Ser. No. 271,635, filed 6/8/81 now abandonded.

BACKGROUND OF THE INVENTION

The present invention relates to the art of cooking and more particularly to a vertical immersion cooking arrangements as described in U.S. Pat. No. 3,985,071.

In many prior art arrangements, for example deep frying devices, shallow horizontal pans are utilized which require greater quantities of shortening than in vertical cooking and which, because of the additional shortening and exposed area to volume relationship, require significantly more energy for cooking a selected item than in arrangements where the surface to volume relationship is lower.

In prior art arrangements where a form of vertical cooking is utilized, the product is usually stacked in the cooker with adjacent pieces in contact so that in many cases the pieces stick together. The device shown in U.S. Pat. No. 3,985,071 provides means to cook food in vertical spaced relation to prevent mutual contact and sticking by disposing the food to be cooked on superposed spaced shelves.

The present invention further relates to the art of cooking filled pastry shells which encapsulate the filling. In prior art practice, for example in making fried pies or other fully filled pastry encapsulations, the item is simply immersed in a heated oil at a selected temperature to be cooked. However, it has been found that in cooking items such as sausage, eggs, pizza, etc., in pastry shells where the shell is not filled, or where the filling shrinks, or where gas is evolved from the filling so that gas or air pockets are located in the shell, heat transfer to the filling is generally poor. Accordingly, it has been found that immersion cooking of such items can be unsatisfactory and that in many instances it is difficult to properly cook the filling without overcooking the shell. It has been found that the problem is particularly acute where the shell rises during cooking, as for example, where the filling evolves vapor, for example steam, during cooking so that the vapor tends to urge the shell away from the filling, leaving insulating gas pockets between the shell and the filling.

Further, prior art methods for cooking filled pastry items have resulted in products which have little strength so are difficult to eat by hand.

SUMMARY OF THE INVENTION

The present invention provides apparatus and method for use in immersion cooking where a basket means is provided including a multiplicity of laterally disposed vertically spaced shelves held within a cylindrical, porous, wall member, where the wall member is divided into at least two sections, each section including laterally extending shelf means where the two sections are relatively movable in a direction parallel to the longitudinal axis of the wall means to allow upper shelves carried in one section to bear against food retained on lower shelves carried by the second wall section or where the spacing between shelves can be selected to preclude vertical expansion of the food item.

Moreover the present invention provides a method of cooking utilizing basket means described previously.

In vertical cooking arrangements where a basket is provided to hold food to be cooked in vertical spaced relation and where the basket is designed to be located in a cooking chamber adapted to hold heat transfer fluid, it has been found that spacing of the shelves holding materials to be processed is important. Further, within the scope of the present invention it has been unexpectedly found cooking certain foods by compressing opposite surfaces of the food being processed provides a unique product which is more uniform and is more desirable.

Moreover, it is known that in processing food, items of different size are processed from time to time and the present invention provides a means for accommodating different sized food items, such as chicken, hamburger and filled pastry items, within the same device while maintaining a compressive force on the product and preventing expansion of the food during cooking.

The present invention further provides a method of cooking food items with pastry shells enclosing a selected edible filling by placing the food item between upper and lower shelves which contact upper and lower surfaces of the item and, immersing the shell in a liquid at a selected cooking temperature so the upper and lower shelves hold the shell in contact with the filling to facilitate heat transfer to the filling from the shell. Further, the devices and methods within the scope of the present invention are useful in cooking foods which tend to curl or distort during cooking.

More particularly, the present invention provides a cooking basket for use in upwardly open cooking chamber adapted to receive a heat transfer fluid with heater means to selectively heat the heat transfer fluid where the basket is generally cylindrical in shape and adapted to be selectively disposed within the chamber with its longitudinal axis generally parallel to the longitudinal axis of the chamber. The basket is defined by first and second generally porous sidewalls with a mean diameter less than the mean diameter of the chamber, where each of the first and second sidewalls terminate in first and second edges generally parallel to the longitudinal axis of the chamber, hinge means joining one edge of each of the first and second side wall means so the free edges of the first and second sidewalls can be closed to adjacent relation to form the basket and opened about the hinge means to provide access to the interior of the first and second sidewalls and wherein each wall section includes shelf means disposed therein extending transversely from the respective sidewall means so that when the sidewall means are closed the shelf means of the first and second sidewall means are mutually disposed in interleaving fashion and where the hinge means are adapted to permit relative longitudinal movement between the first and second sidewall means so that when the basket is closed the shelf means of the first and second sidewall means respectively contact the upper and lower surfaces of food located on the lower shelf means.

Also disclosed is a method of cooking filled pastry devices comprising a pastry shell enclosing selected fillings where the shelf means are in contact with selected areas of the food shell to improve heat transfer to the filling. Specifically in prior art arrangements where the shell expanded away form the filling heat transfer was poor.

It has been found that by partial compression of the shell the shell can be held in contact with the filling to provide sufficient heat transfer to cook the food.

Further, the shelves have openings so limited expansion of the food product is allowed through the openings while the portions contacted by the shelves are compressed to provide an undulating surface for the shell which makes it stronger.

Features in accordance with the present invention are shown and described with reference to the accompanying drawings and specifications, but it will be recognized that other arrangements also within the scope of the present invention will occur to those skilled in the art upon reading the following description.

BRIEF DESCRIPTION OF THE DRAWINGS

An example of a method and apparatus within the scope of the present invention is illustrated in the accompanying drawings wherein:

FIG. 1 is a perspective view of one basket arrangement within the scope of the present invention;

FIG. 2 is an enlarged view of a selected length of the basket of FIG. 1;

FIGS. 3a–3d illustrate stepwise the use of a basket of the type shown in FIG. 1.

DETAILED DESCRIPTION OF THE DRAWINGS

Figure 4A:
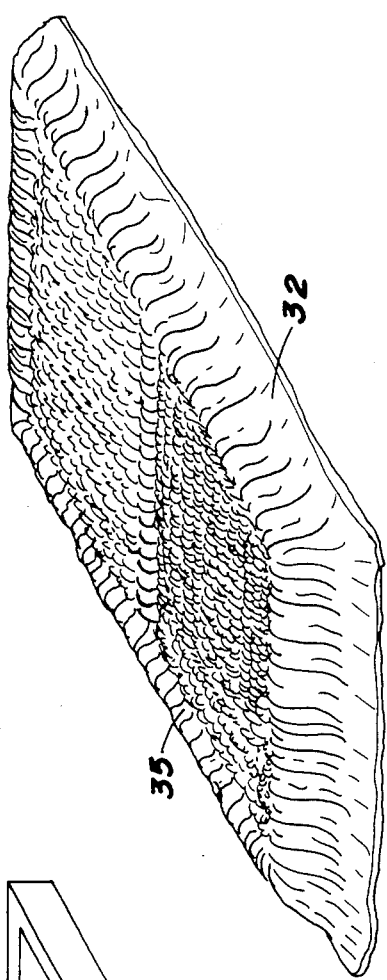
FIGS. 4a–4d illustrate one method for preparing a food item in accordance with the present invention.

FIG. 1 is a perspective illustration of a basket 1 within the scope of the present invention and useful in connection with the method in accordance with the present invention.

Basket 1 is shown in an open position in FIG. 1 and includes two basket halves 2a and 2b. The basket halves 2a and 2b are mirror images and half 2a will be described as typical. Basket half 2a includes shelves 3, of circular perimeter affixed to supports 4, for example wires which run longitudinally parallel to the central axis of the basket half 2a and define porous sidewalls for flow of heat transfer fluid as described hereinafter. As shown, perforations 6 are provided in shelves 3, but it will be understood that within the scope of the present invention other shelf arrangements can be used, for example shelf arrangements utilizing space wires. Alternatively, it will be recognized that baskets within the scope of the present invention can include shelves with apertures or openings within the shelves depending upon the application in which the device is to be applied.

Also while basket halves 2a and 2b shown in FIG. 1 are semi circular in cross section it will be recognized that other cross sectional shapes are equally useful.

In the example of FIG. 1 an outer support rod 5 is provided for basket half 2a to define a first edge of basket half 2a and extends upwardly parallel to supports 4 with a handle 8 formed at the top thereof and a second edge 5b formed by the opposite side of rod 5. Further, with respect to basket half 2a, a support ring 7, while not necessary in some embodiments within the scope of the present invention, is shown in FIG. 1 and carried at the bottom of supports 4 and 5 and located in spaced relation from the lowermost shelf 3 to support the entire assembly in vertical orientation.

Basket half 2b is likewise provided with generally circular shelves 11, having apertures 12 similar to the apertures 6 of shelves 3 and carried by wire supports 10 spaced around a portion of the periphery of shelves 11 to define a porous sidewall. Likewise a vertical support 13 is provided and includes a first end defining a first edge 13A of basket half 2b and extends generally parallel to the longitudinal axis of supports 10 where the intermediate segment of rod 13 forms a handle 16 and the opposite end segment of rod 13 forms a handle 16 and the opposite end segment of rod 13 forms a second edge 13B.

It will be understood that within the scope of the present invention the shelves can be spaced wired members.

Within the scope of the present invention hinge means 18 are provided to connect second edges 5B and 13B that basket halves can be rotated from open position shown in FIG. 1 to closed position shown in FIGS. 3b–3d with supports 5 and 13 in side by side relation.

Shelves 3 and 11 interleave when the basket halves 2a–2b close to form a basket having a generally circular cross-section. Also within the scope of the present invention hinges 18 are adapted, for example by simply using loose fitting hinges, to permit longitudinal movement of edge 13B of basket half 2b with respect to edge 5B of basket half 2a as shown in FIG. 2 so that when a food item is placed on shelves 3 and the basket half 2b is subsequently closed a shelf 11 is located immediately above the food item on each shelf 3.

Accordingly when basket half 2b is allowed to drop by gravity the bottom side of a shelf 11 compresses a food item carried on a shelf 3 to hold the food item in place and provide a compressive force on the food item.

It has been found that in accordance with the present invention the provision of the compressive force continuously during the cooking operation affords the means of providing a unique food item.

It has been further found that in some applications it is helpful to simply provide a selected spacing between upper and lower shelves to prevent expansion of the shell with initial compression of the shell. Accordingly, spacer means can be provided to establish the spacing and in FIG. 2 the length of hinge 18 can be utilized to provide such spacing where the upper and lower sides of hinge 18 engage shelves 3 and 11 when the basket is in closed position.

Operation of the device shown in FIG. 1 is illustrated in FIGS. 3a–3c where in FIG. 3a the device is shown in open mode with food items 19, for example, chicken filets, hamburgers, etc., (foods that might otherwise curl or distort during cooking) resting on shelves 3 of basket half 2a. It will be noted that in this position shelves 11 of basket half 2b contain no food items and are raised so that each of the shelves 11 is located above the top of the food items 19.

In FIG. 2b basket half 2b has been closed so that shelves 3 and 11 interleave and shelves 11 are still positioned above food items 19. In this position the device is self supporting on a bottom most shelf or, as shown in FIG. 1, rests on support 7, or other support means, located at the bottom of basket half 2a.

Likewise handles 8 and 16 are in generally aligned relation so that the device can be easily carried utilizing both handles.

In FIG. 3c basket half 2b has been released and drops downwardly to a position where shelves 11 are at rest on the top of food items 19 to compress the food items slightly at the top and bottom, the degree of compression depending upon the weight of the basket half 2b. In other applications the shelves would be separated a selected distance to prevent expansion or distortion of the food items in preparation.

Finally, in FIG. 3d the assembled device including the food items 19 has been placed in a chamber 21 for example of a cooker 22 where the heating coils 23 surround chamber 21 as shown, and where a heat transfer fluid 25, for example cooking oil, is located within chamber 21 to cover the uppermost food item. In this arrangement, it will be further noted that the assembled basket is supported at the bottom of chamber 22 on the floor 21a. By the method previously discussed it has been found that the quality, texture, and characteristics of certain food items are markedly improved by such cooking procedure and particularly improved by the use of a basket, an example of which is described hereinbefore.

While numerous food items can be prepared in the device and by the method previously described it has been found that filled pastry items prepared in devices utilizing the principle of the present invention are particularly unique and one method of preparing such pastry items and cooking same is described hereinafter with reference to FIGS. 4a–4d.

Specifically, filled pastry items prepared in accordance with the present invention have structural stability, and can be uniformly cooked, both shell and filling. Further the shell has considerable structural stability providing a food item which is easily eaten by hand.

Figure 4B:
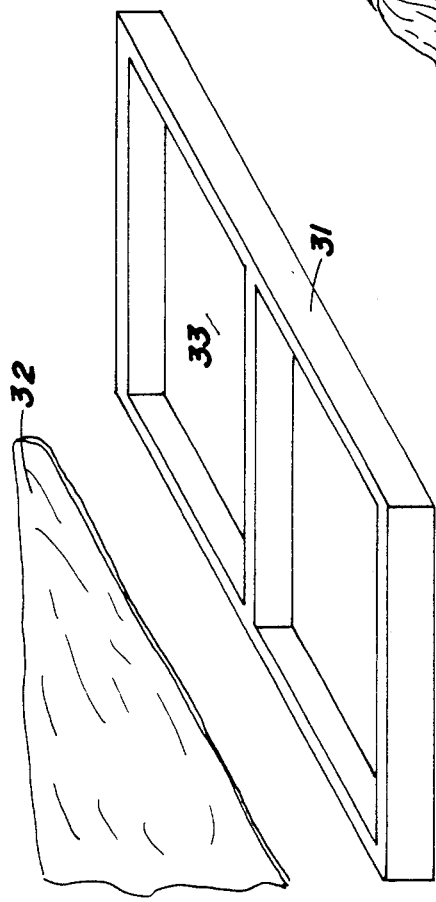
Figure 4C:
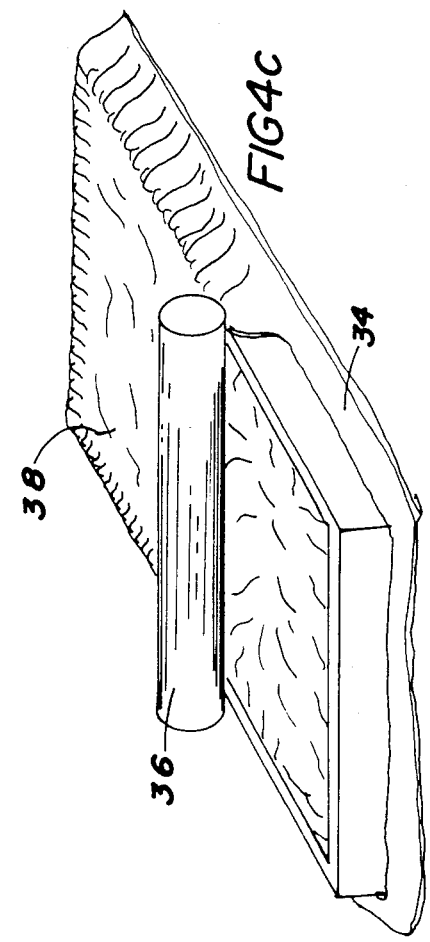
Figure 4D:
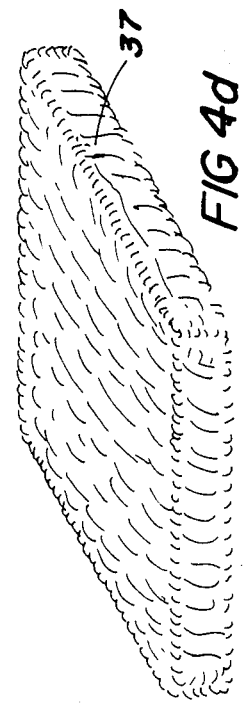

More specifically, FIG. 4a is a view of a mold 31 which is adapted to receive a pastry shell 32 within cavities 33 provided within mold 31. As shown in FIG. 4b a shell 32 is placed within mold 31 and a filling, for example, eggs, fruit mixtures, or other suitable materials are placed within the shell. As shown in FIG. 4c a top pastry shell is placed over the mold and is rolled so that the partitions surrounding the cavities 32 trim off the excess dough and provide pie like food items as shown in FIG. 4d. The items shown in FIG. 4d are then placed in the apparatus described in FIG. 1 and cooked as described with reference to the method shown in FIGS. 3a–3d where the food item is compressed between upper and lower shelves so that upon exposure to the heating fluid the pastry shell is allowed to expand through the openings in the shelves but the solid portion of the shelves maintain a portion of the pastry item in compressed condition to permit heat transfer to the filling.

It is to be understood that the foregoing are but examples within the scope of the present invention and that various other arrangements also within the scope of the present invention will occur to those skilled in the art upon reading the disclosure set forth hereinbefore.

The invention claimed is:

1. A cooking basket for use in an upwardly open cooking chamber containing a heat transfer fluid with heater means to selectively heat the heat transfer fluid where the basket is disposed within the chamber with its longitudinal axis generally parallel to the longitudinal axis of the chamber and where the basket is defined by first and second generally porous sidewalls of selected cross sectional shape each sidewall having a first longitudinal edge and diametrically opposed longitudinal second edge, hinge means pivotably, joining said first edge of each of the first and second side wall means so said second edge of the first and second sidewalls can be closed with second edges in adjoining relation to form the basket and opened about the hinge means to provide access to the chamber defined by each of the first and second sidewalls and wherein each wall section includes shelf means disposed therein extending transversely from the respective sidewall means so that when the sidewall means are closed the shelf means of the first and second sidewall means are mutually disposed in interleaving fashion and where the hinge means are adapted to permit relative longitudinal movement between the first and second sidewall means so that when the basket is closed the spacing between the shelf means of the first and second sidewall means can be selected with the food to be cooked contained between the shelf means of the first and second sidewall means.

2. The invention of claim 1 wherein said first and second sidewall means are semi-circular in cross section.

3. The invention of claim 1 wherein handle means are provided for each of said first and second sidewall means and located above said first and second sidewall means.

4. The invention of claim 1 wherein one of said first and second sidewall means includes base support means to support said first and second sidewall means in upright position.

5. The invention of claim 1 wherein said shelf means are porous to permit flow of fluid therethrough.

6. The invention of claim 1 wherein said shelf of said second side wall means rests on said food item to compress said food item during cooking while said food item rest on said shelf means of said first sidewall means.

* * * * *